United States Patent [19]

Simon et al.

[11] 4,139,413
[45] Feb. 13, 1979

[54] BLOW-OFF DEVICE FOR LIMITING EXCESS PRESSURE IN NUCLEAR POWER PLANTS, ESPECIALLY IN BOILING WATER NUCLEAR POWER PLANTS

[75] Inventors: Ulrich Simon, Frankfurt am Main-Oberrad; Klaus-Dieter Werner, Langen; Dieter Hoffmann, Aschaffenburg; Bernd Pontani, Alzenau, all of Fed. Rep. of Germany

[73] Assignee: Kraftwerk Union Aktiengesellschaft, Mülheim an der Ruhr, Fed. Rep. of Germany

[21] Appl. No.: 784,265

[22] Filed: Apr. 4, 1977

[30] Foreign Application Priority Data

Apr. 5, 1976 [DE] Fed. Rep. of Germany ....... 2614620

[51] Int. Cl.² .............................................. G21C 9/00
[52] U.S. Cl. .................................. 176/38; 261/121 R
[58] Field of Search ............... 176/38, 87; 261/121 R, 261/122, 123, 124

[56] References Cited

U.S. PATENT DOCUMENTS

1,532,233  4/1925  Dahlberg ............................. 261/124
4,022,655  5/1977  Gaouditz et al. ...................... 176/38

FOREIGN PATENT DOCUMENTS

2212761  3/1973  Fed. Rep. of Germany ............. 176/38

*Primary Examiner*—Samuel W. Engle
*Assistant Examiner*—Ralph Palo
*Attorney, Agent, or Firm*—Herbert L. Lerner

[57] ABSTRACT

In a blow-off device for limiting excess pressure in nuclear power plants, at least one condensation tube disposed so that a lower outflow end thereof is immersed in a volume of water in a condensation chamber having a gas cushion located in a space above the volume of water, and an upper inflow end of the condensation tube extends out of the volume of water and is connectible to a source of steam that is to be condensed or a steam-air mixture, the outflow end of the condensation tube, for stabilizing the condensation being provided with an assembly of wall parts forming passageways extending in axial direction for subdividing the steam flow and bubbles produced in the volume of water, the passageways of the assembly of wall parts being stepped in axial direction at both axial ends of the assembly of wall parts.

5 Claims, 4 Drawing Figures

BLOW-OFF DEVICE FOR LIMITING EXCESS PRESSURE IN NUCLEAR POWER PLANTS, ESPECIALLY IN BOILING WATER NUCLEAR POWER PLANTS

The invention relates to a blow-off device for limiting excess presure in nuclear power plants, especially in boiling water-nuclear power plants, and more particularly wherein the blow-off device has at least one condensation tube disposed so that a lower outflow or outlet end thereof is immersed in a volume of water (condensate) in a condensation chamber or receptacle having a gas cushion located in a space above the volume of water, and the upper inflow or inlet end of the condensation tube extending out of the volume of water and being connected to a source of steam that is to be condensed or a steam-air mixture, the outflow end of the condensation tube, for stabilizing the condensation, being provided with wall parts forming passageways extending in axial direction, and stepped from one another at the forward end thereof in flow direction of the steam, the wall parts serving to subdivide steam flow from the source thereof and bubbles produced in the water volume.

Such a blow-off device has become known heretofore from German Published Prosecuted Application DT-AS 2 212 761. In FIG. 5 thereof, the condensation tube narrows down due to tube sections of decreasing diameter that are slid one within another, ring gaps remaining free in the zone in which the tube sections overlap. In this construction, the central steam flow is not yet finely subdivided enough. It has also become known heretofore from German Published Non-Prosecuted Application DT-OS 2 457 901, to dispose in the interior of the condensation tube, a framework extending parallel to the axis thereof and formed of wall parts extending parallel to the axis of the condensation tube. A finer subdivision of the steam flows into partial steam flows is provided thereby, however, consolidation of the steam bubbles and consequent formation of larger bubbles can, nevertheless, continue to occur at the tube end because the travel time of the individual partial steam flows within the passages formed by the wall parts is virtually the same.

It is an object of the invention to provide a blow-off device for limiting excess pressure in nuclear power plants, especially in boiling water-nuclear power plants which is markedly improved over heretofore known devices of this general type and which, more specifically, reliably avoids a consolidation of steam bubbles in vicinity of the end opening of a condensation tube when the steam flow has been finely subdivided into individual partial steam flows.

With the foregoing and other objects in view, there is provided in accordance with the invention, in a blow-off device for limiting excess pressure in nuclear power plants, at least one condensation tube disposed so that a lower outflow end thereof is immersed in a volume of water in a condensation chamber having a gas cushion located in a space above the volume of water, and an upper inflow end of the condensation tube extends out of the volume of water and is connectible to a source of steam that is to be condensed or a steam-air mixture outflow end of the condensation tube, for stabilizing the condensation being provided with an assembly of wall parts forming passageways extending in axial direction for subdividing the steam flow and bubbles produced in the volume of water, the passageways of the assembly of wall parts being stepped in axial direction at both axial ends of the assembly of wall parts. The advantages attained with the invention are primarily that not only the outlet locations of the partial steam flows and bubbles are shifted or offset axially and radially relative to one another but also the inlets thereof into the passageways formed by the wall parts, so that, longer subdivision sections and considerably greater travel time differences for the individual partial steam flows are thereby produced.

In accordance with another feature of the invention the assembly of wall parts constitutes a plurality of tubes in mutually stepped disposition. Such a construction is capable of being realized especially simply from the production-engineering standpoint.

In accordance with additional alternate features of the invention, the plurality of tubes are in the form of a tube bundle or are telescoped one within another.

In accordance with a further feature of the invention, the telescoped tubes are spaced from one another, defining annular zones therebetween, and respective intermediate metal sheets are disposed in the annular zones.

In accordance with an added feature of the invention the plurality of tubes have mutually stepped configurations at the axial inflow and outflow ends thereof that are mirror-images of one another.

In accordance with yet another feature of the invention, the mutually stepped disposition of the plurality of tubes has a substantially double conical structure and is formed by at least one central tube of relatively maximal length and annular zones with stepped tubes of decreasingly shorter relative length disposed around the central tube, one substantially conical end of the structure extending out of the condensation tube, the tubes of the structure extending farthest out of the condensation tube being also the tubes extending farthest into the condensation tube.

In accordance with yet a further feature of the invention, the mutually stepped disposition of the plurality of tubes has an inflow half disposed and retained inside an outflow chamber defined by the lower outflow end of the condensation tube, the outflow chamber having a larger diameter than at least a part of the inflow end of the condensation tube located adjacent the outflow end thereof, the outflow chamber being further defined by a terminating annular wall of the lower outflow end, the terminating annular wall being connected to the upper inflow end of the condensation tube.

In accordance with an additional feature of the invention, the intermediate metal sheets in the annular zones are formed as axially oriented, circular wave-shaped metal sheets subdividing the respective annular zones and serving as spacers.

In accordance with a concomitant feature of the invention, a tube bundle is received in the passageway of the innermost of the telescoped tubes, the innermost passageway being subdivided by the tube bundle.

Other features which are considered as characteristic for the invention are set forth in the appended claims.

Although the invention is illustrated and described herein as embodied in a blow-off device for limiting excess pressure in nuclear power plants, especially in boiling water-nuclear power plants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
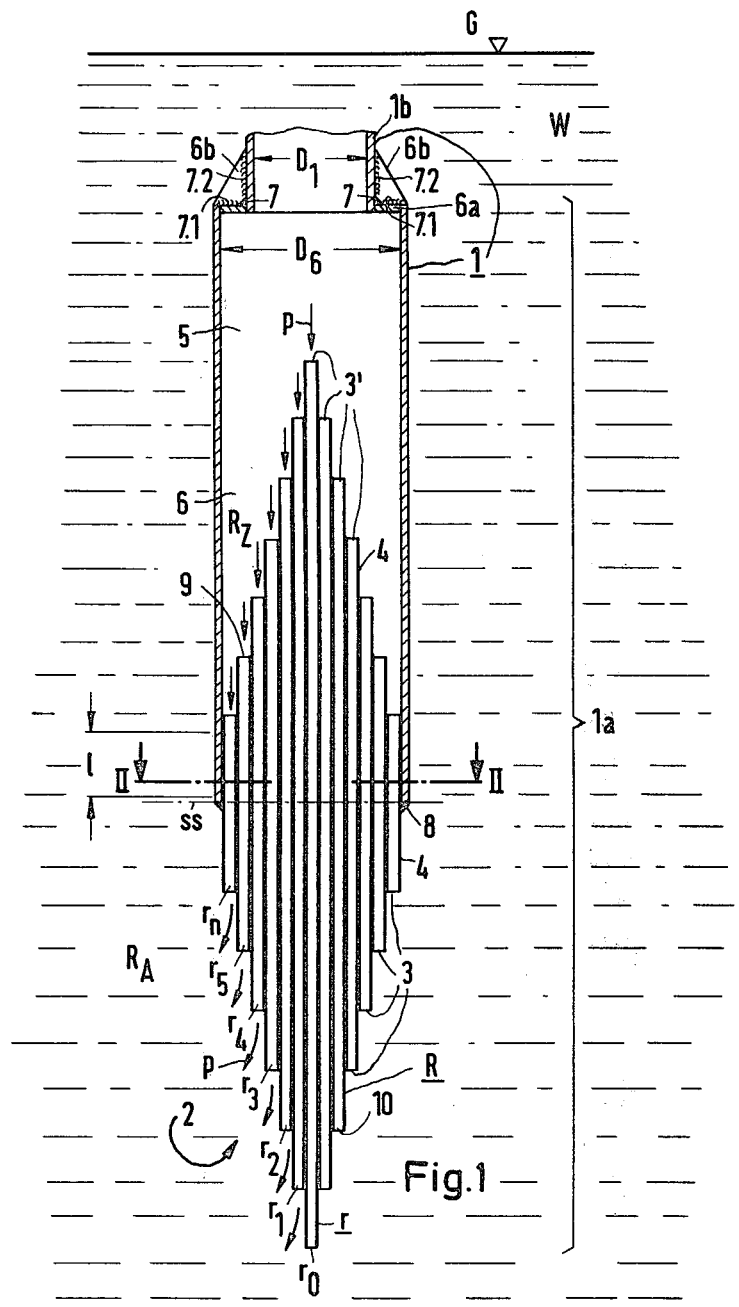
FIG. 1 is a longitudinal sectional view of one embodiment of the outlet geometry of a condensation tube for a blow-off device according to the invention, in the form of a tube bundle in stepped arrangement.

Referring now to the drawing and first particularly to FIG. 1 thereof, there is shown a condensation tube 1, only the lower end of which is illustrated in detail in FIG. 1. The condensation tube 1 belongs to an otherwise non-illustrated blow-off device for limiting excess pressure in nuclear power plants. What is involved herein, especially, is a light water-cooled nuclear power plant, preferably a boiling water reactor-nuclear power plant wherein at least one such condensation tube, though preferably a multiplicity thereof, is mounted with the lower out flow end thereof immersed in a volume of water W received in a condensation chamber (water receptacle) having a gas cushion G, especially an air cushion, provided above the surface of the water W, the upper inflowing end of the condensation tube projecting out of the water receptacle and being connected to a source of steam that is to be condensed or to a steam-air mixture. Thus, it may be that within the so-called pressure-reduction system, which is provided in the safety vessel, a steam-water mixture flows out of the reactor or a line of the coolant circulatory loop, in the event of an accident, and pressure is effectively reduced by rapid condensation of the steam. It can also be that the steam which is depressurized is that of the blow-off lines of the pressure equalization and safety valves of the exhaust steam of the emergency condensation and emergency feed turbines. It is important for the condensation process that a very broad spectrum of possible steam flow densities is provided. Thus, in the case of blow-off of the relief valves in the respective condensation tubes, high steam flow densities exist, the same being true at the start of coolant loss trouble. In the exhaust steam lines and the respective condensation tubes of the emergency condensation and the emergency feed turbines as well as in the course of a coolant loss occurrence, the steam flow densities are, by contrast, very low. Even lower steam flow densities can occur also in the condensation tubes connected to the blow-off lines of the depressurizing valves and, in fact, when a depressurizing valve springs a leak, and a lingering or creeping steam flow sets in. The incident steam flow densities drop from about 1000 kg/m$^2$ sec during blow-off of the depressurizing valves down to 2 to 10 kg/m$^2$ sec during the creeping steam flow.

The condensation tube 1, which is formed of a main part 1b and an outflow tube part 1a connected thereto, is provided within the outflow tube part 1a, at the outflow side 2 thereof, with wall portions 4 extending in axial direction of the tube 1 forming passageway cross sections that are offset or stepped one from the other, for the purpose of stabilizing the condensation. In addition, at the inflow side 5 i.e. in the interior of the condensation tube 1, wall portions 4 are provided forming passageway cross sections 3'. As is apparent from FIG. 1, the wall parts 4, are constructed as stepped tube bundles, being formed out of individual bundle tubes $r_o$, $r_1$ and so on to $r_n$, which are combined into a bundle. It is especially desirable if the stepped tube bundle, as shown, has a somewhat double conical shape in a manner that, around a central bundle tube $r_o$ or several of such bundle tubes $r_o$ of maximal length, ring zones Z, to $Z_n$ (note FIG. 2), identified generally as Z, are disposed with stepped bundle tubes r, which include the aforementioned bundle tubes $r_1$ to $r_n$, becoming respectively shorter. The bundle tubes $r_o$, which project farthest out of the condensation tube 1 or the outflow tube part 1a thereof, also extend farthest into the outflow tube part 1a. The outermost bundle tubes $r_n$, which project the least out of the condensation tube 1, extend correspondingly the least into the interior of the outflow tube part 1a. A Christmas tree-like stepping both inwardly as well as outwardly is thus provided that, in the illustrated embodiment of FIG. 1, is mirror-symmetrical with respect to the symmetry plane represented by the dot-dash line ss. Naturally another tube stepping and another tube cross section are conceivable, for example, a tube stepping which extends in a twisting or winding serpentine or garland-like course around the central bundle tube or around several thereof.

The stepped tube bundle identified generally as R has an inflow half $R_Z$ which, as shown, is disposed and held within a tubular outflow chamber 6 surrounded by the outflow tube part 1a. The inner diameter $D_6$ of the outflow tube part 1a is equal to or up to about one-third greater than the inner diameter D, of the main part 1b of the condensation tube 1. The outflow chamber 6 is provided, in the latter case, with a terminating annular wall 6a and fastened thereat by a welding seam 7 to the main part 1b. Reinforcing ribs 6b, distributed over the outer periphery of the main part 1b, are welded by welding seams 7.1 and 7.2 both to the terminating annular wall 6a as well as the tubular wall of the main part 1b.

The outflow chamber 6 with the stepped tube bundle R can be welded as a separate structural member, in a relatively simple manner, to the terminal end of the main part 1b of the condensation tube 1. The individual bundle tubes r of the tube bundle R can be welded themselves one to another; it is more advantageous to connect them one to another by high frequency soldering or brazing, for example, at the section l, the clamped-together bundle provided with necessary solder deposit being then hard-soldered in one soldering operation to one another. This tube bundle is then also hard-soldered or welded (welding seam 8) inside the outflow chamber 6 at the outer periphery of the bundle to the tubular part 1a surrounding and defining the chamber 6, the welding seam 8 requiring adequate axial spacing from the hard-soldered locations and the hard-soldered locations additionally requiring cooling during the welding process so as to prevent re-melting thereof.

As is apparent, inlet openings 9 of the individual bundle tubes r are not only radially but also axially shifted relative to one another a distance equal to several tube widths and, correspondingly, the outlet openings 10 are shifted relative to one another. The core of the steam flow thereby receives the greatest passageway section, and those partial steam flows disposed farther toward the outer periphery shorter passageway tube lengths respectively. A result thereof is that the steam flow, for low mass flow densities, flows preferentially out of the outer passageway cross sections, and that, at higher mass flow densities, the steam flow is distributed largely uniformly over the stepped tube bundle R. On the outlet side, a fine network of partial steam flows is formed, flowing not only through the bundle tubes r themselves but also through the spaces r′ between the tubes r (note FIG. 2). The intermediate spaces r′ become effective especially for lower steam flow rates so that, for the stepped tube nozzle according to the invention, a good distribution effect is produced over the entire region of the steam flows to be processed. The course of the partial steam flows is indicated by arrows p for the left-hand half of the tube bundle R shown in FIG. 1.

Figure 3:
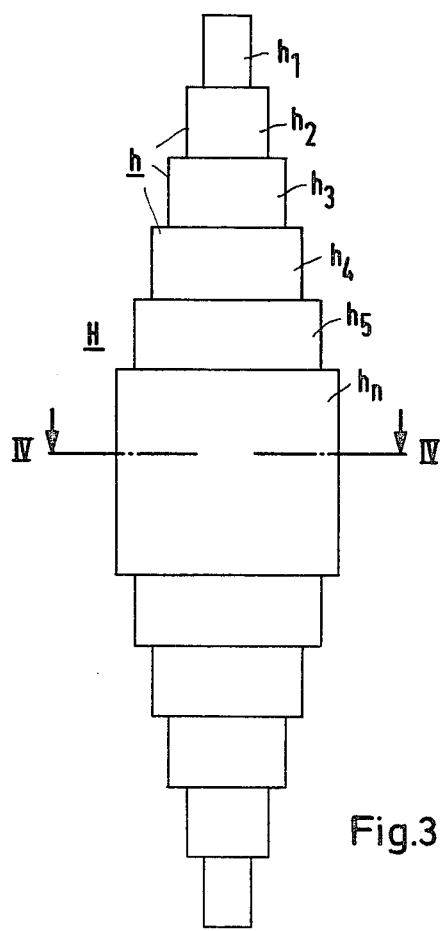
FIG. 3 is a longitudinal view of another embodiment of FIG. 1 with a stepped casing-tube arrangement as outlet geometry wherein, in the interest of simplification, the condensation tube is omitted and only the outer outlines or contours are shown.
Figure 4:
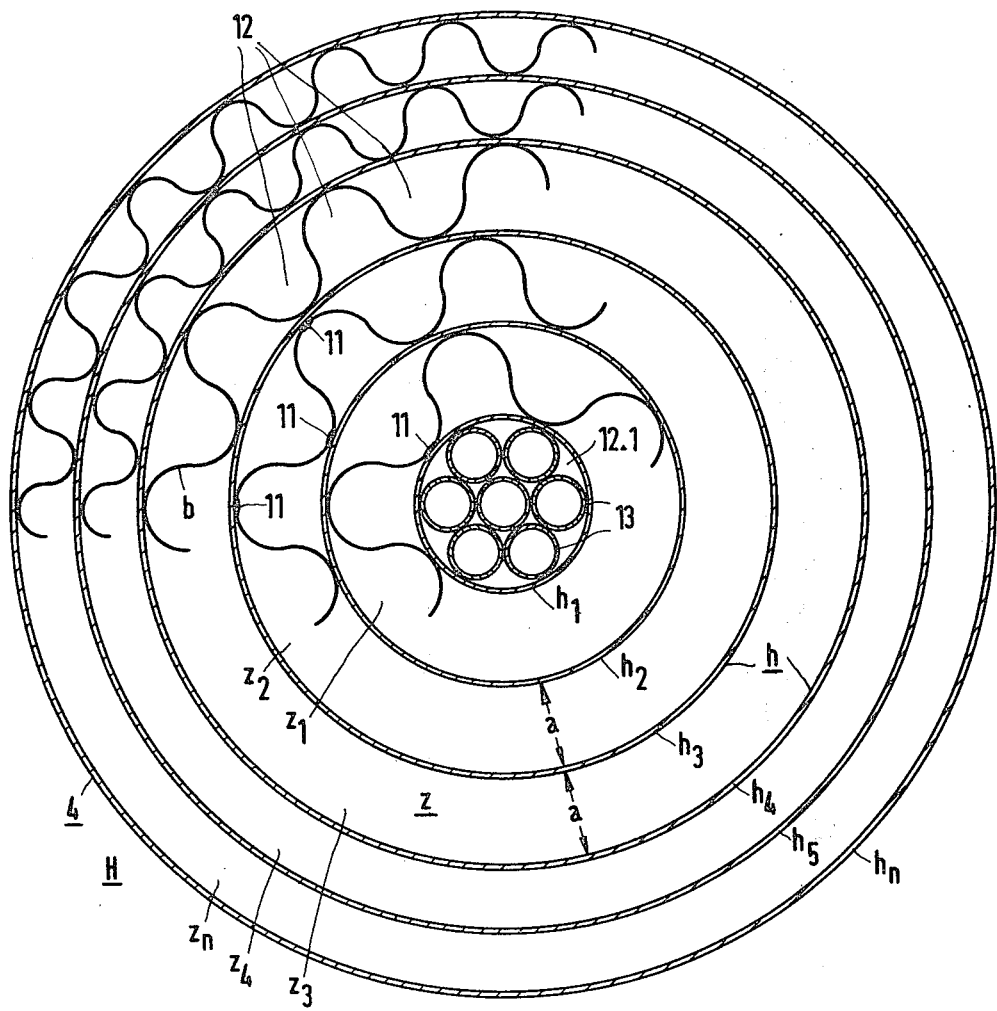
FIG. 4 is a cross-sectional view of FIG. 3 taken along the line IV—IV in the direction of the arrows.

In the second embodiment of the invention shown in FIGS. 3 and 4, the wall parts 4 are formed as a stepped jacket tube assembly H with intermediate sheetmetal members b disposed in annular zones generally identified as Z. To form the wall parts 4′, the jacket tubes identified, as a whole, by h, are mutually telescoped with respective radial clearances 2 forming the annular zones Z in such manner that, starting with the innermost jacket tube h, with the greatest axial length, the axial lengths of the jacket tubes successively disposed radially outwardly from the innermost tube h, to the outermost jacket tube $h_n$ with the largest diameter are stepwise reduced. The intermediate metal sheets b in the annular or ring zones Z are axially oriented, circular wave-shaped metal sheets as shown in FIG. 4 which serve both for more finely subdividing the annular zones Z and also as spacer members for the telescoping tubes h.

Figure 2:
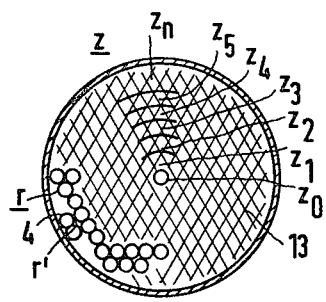
FIG. 2 is a cross-sectional view of FIG. 1 taken along the line II—II in the direction of the arrows.

In the illustrated embodiment of FIGS. 3 and 4, six telescoped jacket tubes $h_1$ to $h_n$ with five corresponding annular zones $Z'_1$ to $Z_n'$ are provided in the intermediate clearance gaps between respective mutually adjacent jacket tubes, the subscript n as applied to the reference characters Z and h expressing, as also in the case of the first embodiment shown in FIGS. 1 and 2, that the number of the jacket tubes h and the intermediate zones Z or Z′ or the bundle tubes r can be varied upwardly and downwardly. The intermediate metal sheets b are shown only around part of the periphery in FIG. 4, it being understood that they extend over the entire periphery of the respective annular zones Z′. Somewhat sinusoidally wave-shaped intermediate metal sheets b are shown. The metal sheets b are connected by spot welds to the jacket tubes h, as shown in FIG. 4. The intermediate metal sheets b serve as spacers, a total, inherently very stable structure for the stepped jacket tube assembly is attained due to the welds 11. Instead of the sinusoidally wave-shaped intermediate metal sheets b, trapezoidal or zig-zag wave-shaped intermediate metal sheet, for example, can also be used in accordance with the desired cross section of the axial channels 12 formed by the intermediate metal sheets b and the jacket tubes h. The passageway cross section 12.1 of the innermost jacket tube h, is subdivided by a tube bundle formed of the tubes 13, the innermost jacket tube $h_1$ being also provided with high rigidity or bending strength. In addition, the attachment of the stepped jacket tube assembly H in the condensation tube 1 or the out flow tube part 1a thereof, as in the initially disclosed embodiment of FIGS. 1 and 2, also has a largely mirror-symmetrical disposition, as shown in FIG. 3, which is of advantage.

It is also noted that because of the rhombic tube-spacing grid pattern 13 (FIG. 2), the annular zones Z of the initially disclosed embodiments of the invention have the contours of a quadrilateral or, in fact, a parallelogram. In the second disclosed embodiment (FIG. 4), on the other hand, the annular zones Z′ have an annular or circular ring-shaped contour.

There are claimed:

1. In a blow-off device for limiting excess pressure in nuclear power plants, at least one condensation tube disposed so that a lower outflow end thereof is immersed in a volume of water in a condensation chamber having a gas cushion located in a space above the volume of water, and an upper inflow end of the condensation tube extends out of the volume of water and is connectible to a source of steam that is to be condensed or a steam-air mixture, said outflow end of the condensation tube, for stabilizing the condensation, being provided with an assembly of wall parts forming passageways extending in axial direction for subdividing the steam flow and bubbles produced in the volume of water, said passageways of said assembly of wall parts being stepped in axial direction at both axial ends of said assembly of wall parts, said assembly of wall parts constitutes a plurality of tubes in mutually stepped disposition, said telescoped tubes are spaced from one another, defining annular zones therebetween and respective intermediate metal sheets are disposed in said annular zones.

2. Device according to claim 1 wherein said intermediate metal sheets in said annular zones are formed as axially oriented, circular wave-shaped metal sheets subdividing the respective annular zones and serving as spacers.

3. Device according to claim 2 including a tube bundle received in the passageway of the innermost of said telescoped tubes, said innermost passageway being subdivided by said tube bundle.

4. In a blow-off device for limiting excess pressure in nuclear power plants, at least one condensation tube disposed so that a lower outflow end thereof is immersed in a volume of water in a condensation chamber having a gas cushion located in a space above the volume of water, and an upper inflow end of the condensation tube extends out of the volume of water and is connectible to a source of steam that is to be condensed or a steam-air mixture, said outflow end of the condensation tube, for stabilizing the condensation, being provided with an assembly of wall parts forming passageways extending in axial direction for subdividing the steam flow and bubbles produced in the volume of water, said passageways of said assembly of wall parts being stepped in axial direction at both axial ends of said assembly of wall parts, said assembly of wall parts constitutes a plurality of tubes in mutually stepped disposition, said plurality of tubes having mutually stepped configurations at the axial inflow and outflow ends thereof that are mirror-images of one another.

5. In a blow-off device for limiting excess pressure in nuclear power plants, at least one condensation tube disposed so that a lower outflow end thereof is immersed in a volume of water in a condensation chamber having a gas cushion located in a space above the volume of water, and an upper inflow end of the condensation tube extends out of the volume of water and is connectible to a source of steam that is to be condensed or a steam-air mixture, said outflow end of the condensation tube, for stabilizing the condensation, being provided with an assembly of wall parts forming passageways extending in axial direction for subdividing the steam flow and bubbles produced in the volume of water, said passageways of said assembly of wall parts being stepped in axial direction at both axial ends of said assembly of wall parts, said assembly of wall parts constitutes a plurality of tubes in mutually stepped disposition, said mutually stepped disposition of said plurality of tubes constituting a substantially double conical structure and being formed by at least one central tube of relatively maximal length and annular zones with stepped tubes of decreasingly shorter relative length disposed around said central tube, one substantially conical end of said structure extending out of said condensation tube, the tubes of said structure extending farthest out of said condensation tube being also the tubes extending farthest into said condensation tube.

* * * * *